(12) United States Patent
Lund

(10) Patent No.: US 7,344,462 B1
(45) Date of Patent: Mar. 18, 2008

(54) TORQUE TRANSFER DEVICE

(76) Inventor: David R. Lund, 435 Dickey Rd., E. Cornith, VT (US) 05040

( * ) Notice: Subject to any disclaimer, the term of this patent is extended or adjusted under 35 U.S.C. 154(b) by 240 days.

(21) Appl. No.: 10/176,009

(22) Filed: Jun. 19, 2002

Related U.S. Application Data

(63) Continuation-in-part of application No. 09/507,544, filed on Feb. 18, 2000, now abandoned.

(51) Int. Cl.
*F16H 7/06* (2006.01)

(52) U.S. Cl. .................................... 474/155

(58) Field of Classification Search ............... 474/140, 474/144, 146, 148, 155, 164, 202, 203, 206, 474/209; 59/78, 78.1, 84; 384/44, 51; 81/57
See application file for complete search history.

(56) References Cited

U.S. PATENT DOCUMENTS

| | | | |
|---|---|---|---|
| 2,551,821 A * | 5/1951 | Bengtson | 74/216.3 |
| 2,817,256 A | 12/1957 | Malone et al. | |
| 2,953,930 A | 9/1960 | Meyer | |
| 4,561,703 A | 12/1985 | Dabringhaus | |
| 4,879,977 A * | 11/1989 | Restelli | 123/90.31 |
| 4,906,110 A | 3/1990 | Van Wyk et al. | |
| 4,952,784 A * | 8/1990 | Pike | 235/101 |
| 5,461,949 A | 10/1995 | Carver | |
| 5,540,122 A | 7/1996 | Lund | |
| 5,540,123 A | 7/1996 | Lund | |
| 5,586,474 A | 12/1996 | Lund | |
| 5,597,243 A | 1/1997 | Kaiser et al. | |
| 5,860,335 A | 1/1999 | Lund | |
| 5,927,858 A | 7/1999 | Agari | |
| 6,152,602 A | 11/2000 | Honma et al. | |
| 6,193,624 B1 | 2/2001 | Lund | |

FOREIGN PATENT DOCUMENTS

| DE | WO-92/14070 | 9/1992 |
|---|---|---|
| GB | 2236828 | 4/1991 |

* cited by examiner

Primary Examiner—Vicky A. Johnson

(57) ABSTRACT

A torque transfer device allows torque to be input at one point of the device and transferred to another point of the device, at which the power or torque is taken from the device. The device incorporates a continuous direct drive comprised of a plurality of alternating pins and links which advance each other to provide the drive. The direct drive communicates with drive sprockets, traveling through the drive sprockets to rotate the drive sprockets to transfer torque.

13 Claims, 16 Drawing Sheets

TORQUE TRANSFER DEVICE

This application is a continuation-in-part of application Ser. No. 09/507,544 which was filed Feb. 18, 2000 now abandoned.

FIELD OF THE INVENTION

This invention relates to a device for transferring torque.

BACKGROUND OF THE INVENTION

There are many devices which transfer torque, or rotational velocity, from one point to another. Chains, belts and similar direct drive transfer rotational movement from one gear or pulley or similar drive means to a second or subsequent gear or pulley or similar driven means.

In some applications, it is desirable to transfer relatively high torque from one point to another point, or from one device to another device. In such applications, space limitations may be a factor. The relatively high torque to be transferred may preclude the use of torque transfer devices which cannot handle heavy duty loads, while space does not permit the use of large devices. An example of such space limitations are torque transfer devices which are placed within enclosures. Examples of devices which transfer relatively high torque are tools which are used to tighten fasteners by the application of torque. Engines and motors use torque transfer devices both operationally, such as camshaft drives, and as power take off devices, such as chain drives on motorcycles. High torque and limited space is a factor in such devices.

Various wrenches, extensions, ratchets, adapters and power transfer tools and devices are disclosed in the prior art. Similarly, camshafts and similar devices are driven by the application of relatively high torque where space for the application of the drive means is limited. Problems are encountered with such devices where the devices are enclosed in relatively small housings, or are otherwise required to be relatively compact in comparison to the torque to be transferred. Common problems experienced with the devices of the prior art include friction and wear between the housing of the device and the drive means, inadequate strength of the drive means or gears, and inadequate or improper engagement of the drive means and the gears due to space limitations.

An additional problem which is experienced relates to stretching of the drive means. The drive means is subjected to substantial forces as power is transferred from one drive gear to the other drive gear. Over time, the drive means will stretch, causing problems in the operation of the device.

Other drive means jam or bind due to bunching of the drive means at the points of entry or exit to the drive sprockets. The path traveled by the drive means or the structure of the drive means causes such jamming or binding.

SUMMARY OF THE PRESENT INVENTION

The present invention is a device which transfers torque from one point to a second remote point of the device. A drive means or drive tool inputs torque into the device at a first point, and the rotational movement, and torque, is taken, or harvested, from the second remote point. Typically, the transfer of the rotation by the tool will be along a path of travel which is not on the same axis as the rotation of the drive tool.

The invention incorporates a direct drive which connects a first drive sprocket to a second drive sprocket. The first sprocket rotates as torque is applied to the first sprocket, and as the first sprocket engages the direct drive, the direct drive engages the second drive sprocket, causing it to rotate.

The direct drive is comprised of a plurality of alternating pins and links, which form a continuous loop. The pins and links engage the drive sprockets as the pins and links are advanced. The pins and links are not attached to each other. Forming the direct drive means from a series of pins and links which contact each other, but which are not connected, eliminates problems which are associated with wear when chains or belts are used as the drive means. The pins will not stretch or break, and are able to handle high torque loads. The pins have an arcuate surface which acts as a bearing surface with regard to the sprockets, and the links have arcuate ends which engage the pins.

The pins are formed to have a reduced center dimension, and are shaped like a dumb bell. The sprockets are formed to each have an upper and lower set of teeth with a space between them. The ends of the pins engaged the teeth, and the links engaged the space in the teeth. The interaction of pins, the links and the upper and lower teeth of each of the drive sprockets according to the invention prevents jamming of the direct drive.

DESCRIPTION OF THE PREFERRED EMBODIMENT

The present invention is characterized by a direct drive that is driven by a first drive sprocket, or gear, or similar rotational device. The direct drive, in turn, drives a second drive sprocket, or gear, or pulley, or a similar rotational device. The direct drive transfers torque from the first rotating member, or sprocket, to a second, or perhaps subsequent, sprocket.

Figure 1:
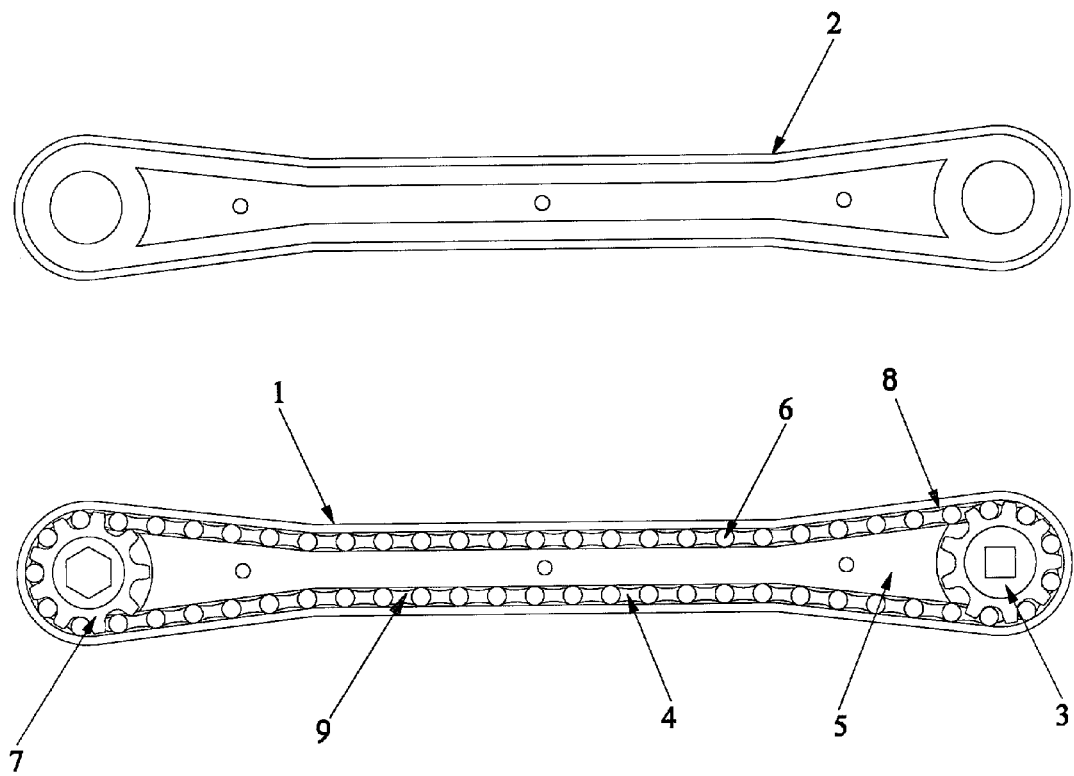
FIG. 1 is a top plan view of the device with the housing separated to reveal the interior of the device.

FIG. 1 shows the elements of the device. The direct drive 9 is comprised of a plurality of alternating pins 6 and links 4. The pins and links abut each other as shown, but are not attached to each other.

The pins and links form a continuous loop direct drive. The continuous loop direct drive rotates through a first drive sprocket 3 and a second drive sprocket 7. The first drive sprocket receives torque from an external input source, and is the drive sprocket. One sprocket 3 has a void for a rectangular drive, and the remaining sprocket 7 has a hexagonal void, although other configurations could be used. The drive sprocket rotates, and each tooth of the drive sprocket engages a pin, pushing the pin through the drive sprocket, and pushing the pin as it exits the tooth of the drive sprocket. The force applied to a pin as it exits the drive sprocket causes the pin to move along. As the pin exits the tooth which it occupied, the pin pushes the adjoining link which the pin abuts, and which is ahead of, the pin. Each link, in turn, pushes the pin adjoining it and ahead of it, advancing the pins and links, and advancing the continuous loop direct drive.

A shedder 5 is centrally disposed within the housing to direct the travel of the pins and links. The shedder directs the pins and links through the housing. The The device is contained within the housing. The housing may be formed in two parts 1, 2. The parts 1,2 may be identical to each other. The housing may be elongated. The shedder and the interior walls of the housing direct the travel of the pins and links.

As the pins enter the second, or driven, sprocket, they engage the teeth and push the driven sprocket, causing it to rotate. A tool or other device may be attached to the driven sprocket, and torque taken or harvested from the driven sprocket. The pins and links exit the driven sprocket, and engage the shedder, and continue to be pushed through the housing, and back to the drive sprocket. The pin behind in the direction of travel pushes the link ahead, in a chain, providing the continuous direct drive housing may have a race formed in it in which the ends of the pins track.

Figure 2:
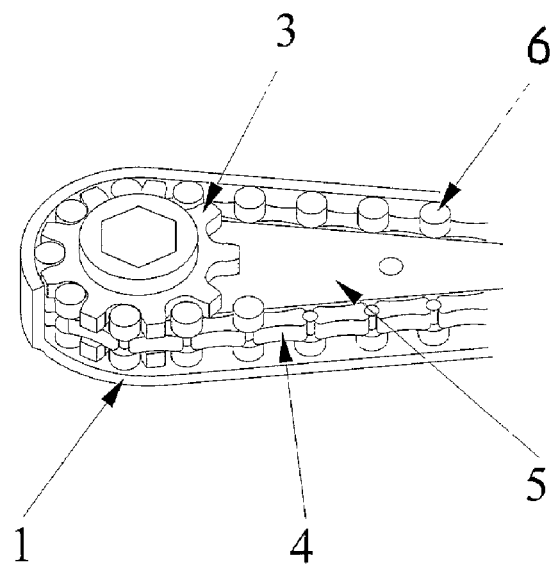
FIG. 2 is a sectioned, partial view of the device.
Figure 4:
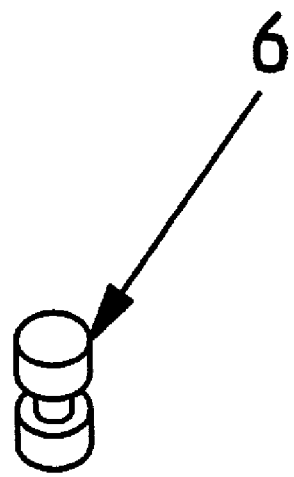
FIG. 4 is a perspective view of one of the pins which forms the direct drive.

The pins 6 have a reduced center dimension, and have a greater dimension on each end. As shown in FIG. 4, the pins are shaped like a dumb bell used in weight lifting, but will typically be substantially smaller and lighter than an actual dumb bell. The key feature of the embodiment of the pins as shown is that they are larger on each end than in the center. As shown, each end of the pin is of one diameter, and the center is of a smaller diameter than the ends. This structure allows engagement of the pins with the links at the smaller diameter, and with the upper and lower teeth of the sprocket at the larger diameter ends of the pins. FIG. 2. The interaction of pins, the links and the drive sprockets according to the invention prevents jamming of the direct drive.

Figure 3:
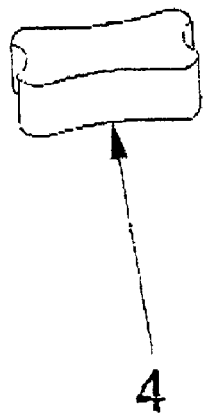
FIG. 3 is a perspective view of one of the links which forms the direct drive.

The links are formed to engage the pins at the reduced diameter center of the pins. The links are of an appropriate thickness to engage the center of the pins. Each link has arcuate ends which correspond to the diameter of the center of the pin. FIG. 3. The center diameter of the pin engages a link at the arcuate surface of the link. A bearing surface is formed which allows rotation of the link relative to the pin, with minimal wear, and without binding. While there is contact with each pin by two links, and by each link with two pins, the pins and links are not attached to each other.

The sprockets are adapted to engage the pins and links. The sprockets have an upper set and a lower set of teeth, with a space between the sets of teeth. Each pin engages a tooth of the sprocket, with one end of the pin engaging a tooth of the upper set of teeth, and the opposite end of the pin engaging the corresponding tooth of the lower set of teeth opening. The space between the upper and lower set of teeth of the drive sprocket accepts the links. FIG. 2.

The pins contact the teeth of the sprockets on the ends of the pins. The curved surfaces act as bearings, and since they are not attached to each other or to the links, the pins can rotate about their axis. This structure yields a direct drive which is low in associated friction, resulting in minimal wear, as compared with chain drives formed of connected links.

Points 8 are formed on the ends of the shedder. As the pins and links leave the sprocket, the points of the shedder pick the pins and links from the teeth and place them back on the shedder, on an initial line along the shedder that is approximately a tangent line. Entry of the pins into the drive sprocket is at a very low angle of attack to the sprocket, and departure of the pins from the sprocket occurs with only a small change in the angle of travel of the pins.

Accordingly, the direct drive is guided along a precise path by the walls of the housing and the shedder. The pins and links enter and exit the drive sprockets without jamming at the entry and exit points. The radius of the housing on each end is such that the pins are held within the teeth of the drive sprocket by the housing as shown in FIG. 1. This structure provides for very smooth operation of the device without jamming or binding of the pins and links, which are not attached.

Figure 5:
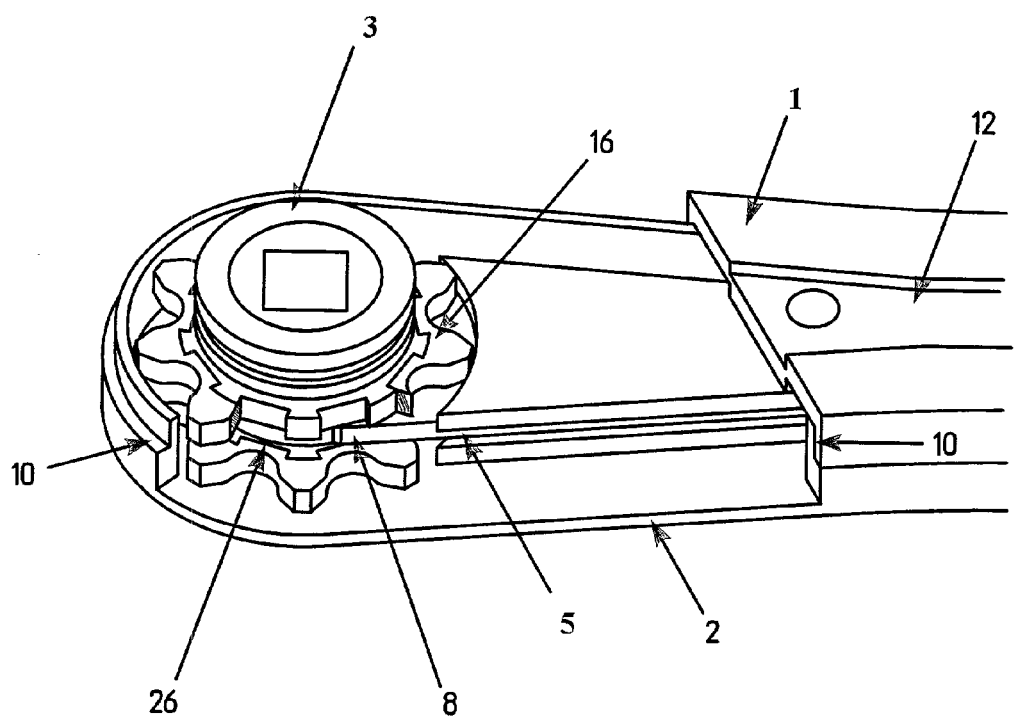
FIG. 5 shows one end of the device, with the housing partially sectioned.
Figure 6:
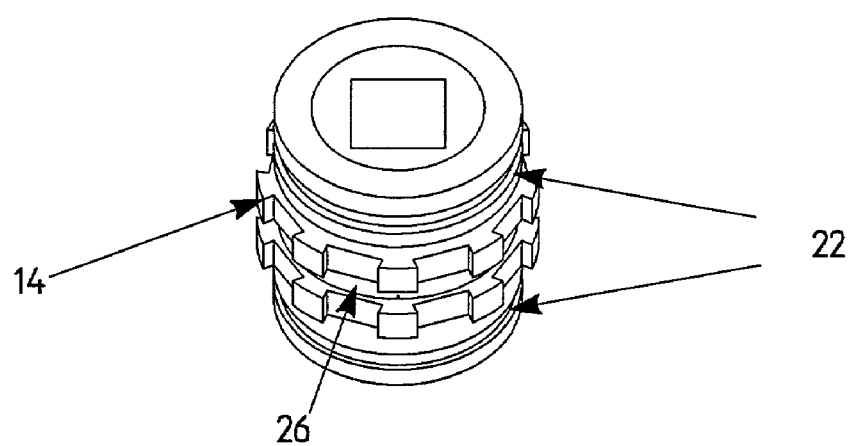
FIG. 6 is an isolation of a sprocket.
Figure 15:
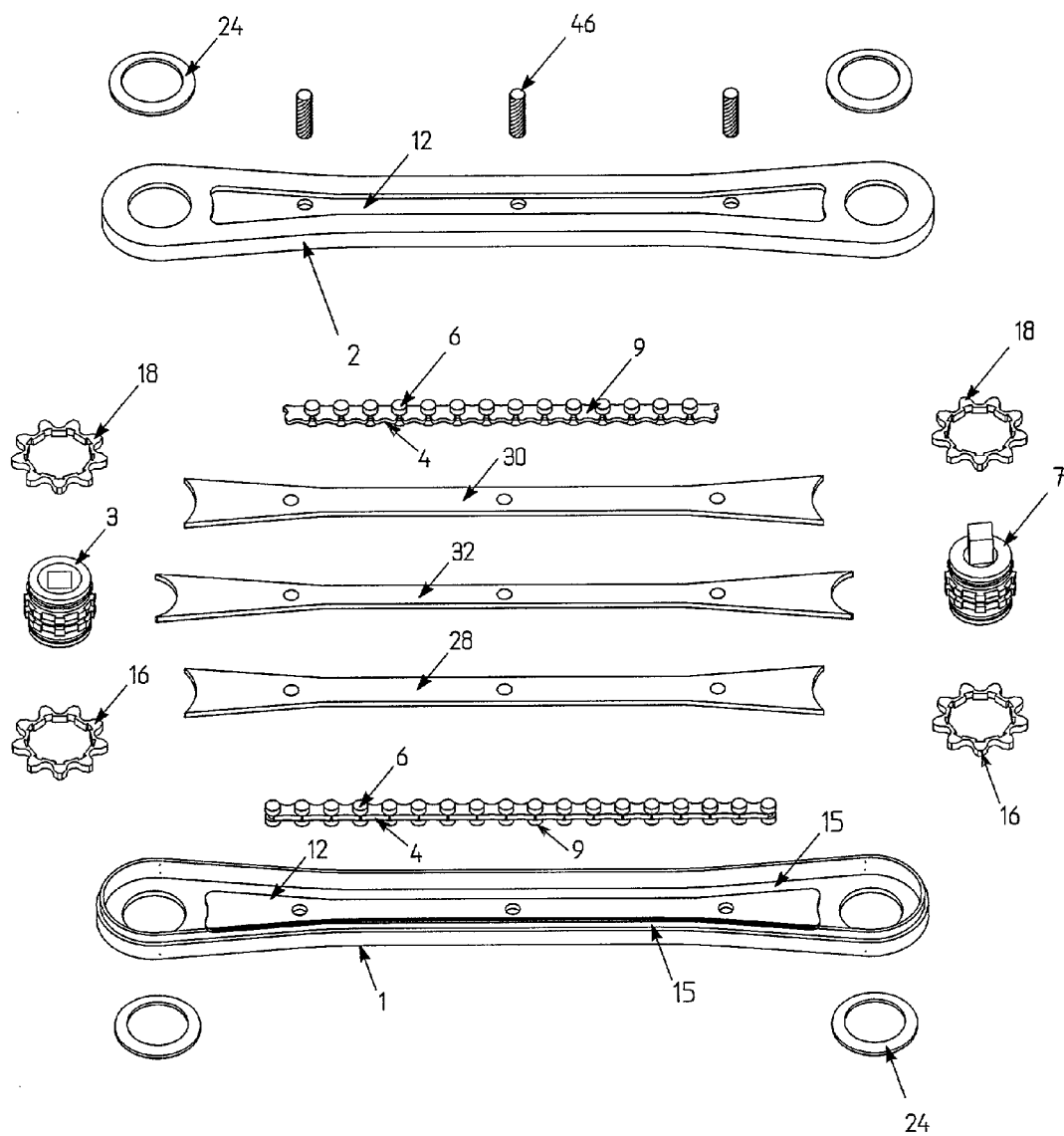
FIG. 15 is an exploded view showing all components of the device.
Figure 16:
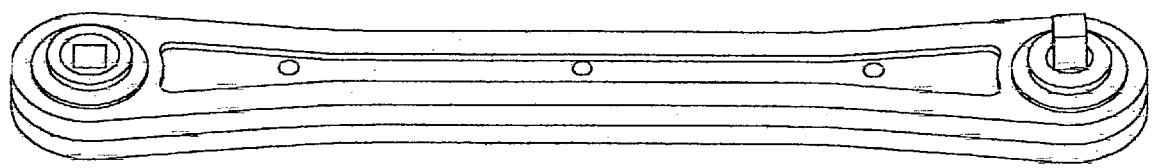
FIG. 16 is a prospective view of the assembled device.

FIG. 5 shows the housing, holding components of the device in position and in proper relationship to permit transfer of torque from sprocket 3 to sprocket 7. The housing is preferred to have interlocking milled steps 10 that hold the top 1 and bottom 2 in location. Ribs 12 present in the top and bottom of the housing contact and hold the shedder 5 to retard movement of the shedder. The ribs also add strength to the device for handling high torque. The ribs extend from the upper and lower sections of the housing, and shown in FIG. 15, and extend into the interior of the housing. The ribs are longitudinally disposed like the shedder, and have generally the same perimeter dimensions as the corresponding upper level of the shedder and lower level of the shedder, although the perimeter dimensions of the ribs may be less than the perimeter dimensions of the shedder. The space between the ribs and the side of the housing, along with the shedder, form a track for the pins to travel in.

Figure 10:
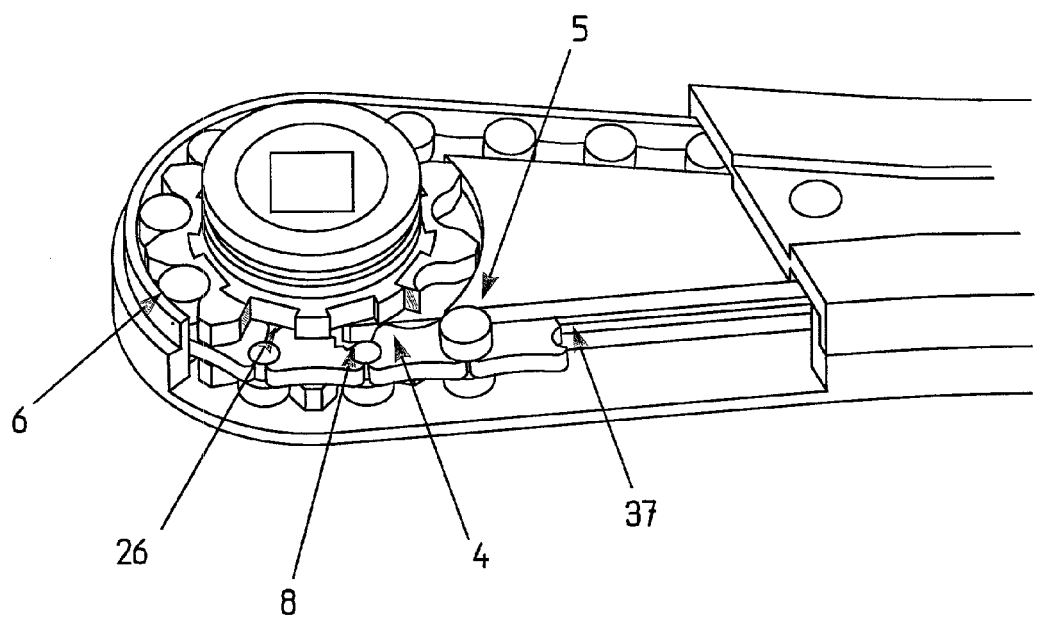
FIG. 10 is the view of the device of FIG. 5, with the direct drive means in place, with portions of the direct drive means and teeth of the sprocket sectioned.
Figure 11:
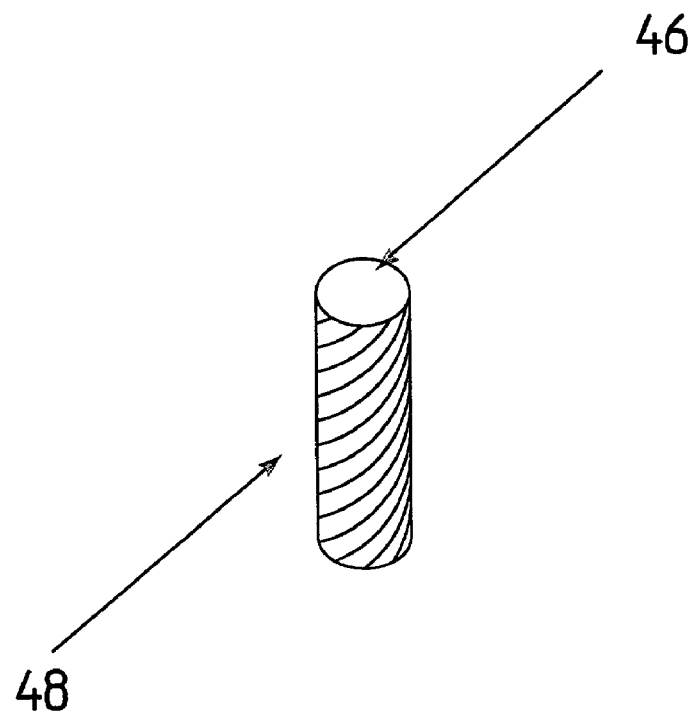
FIG. 11 is a rivet used to hold components of the device together.

The interior perimeter of the housing is sufficiently deep to contain and direct the pins 6. FIG. 10. This interior perimeter acts as a track 15 through which the pins travel. The housing may have various shapes, although the reduced center dimension as shown is preferred. An object of the present invention is to provide a device which will transfer torque to a point where there is difficulty in positioning a drive. The use of the housing as shown provides relatively straight lines of travel for the pins between the sprockets, while also providing a housing of minimum dimensions for working in tight spaces.

Figure 12:
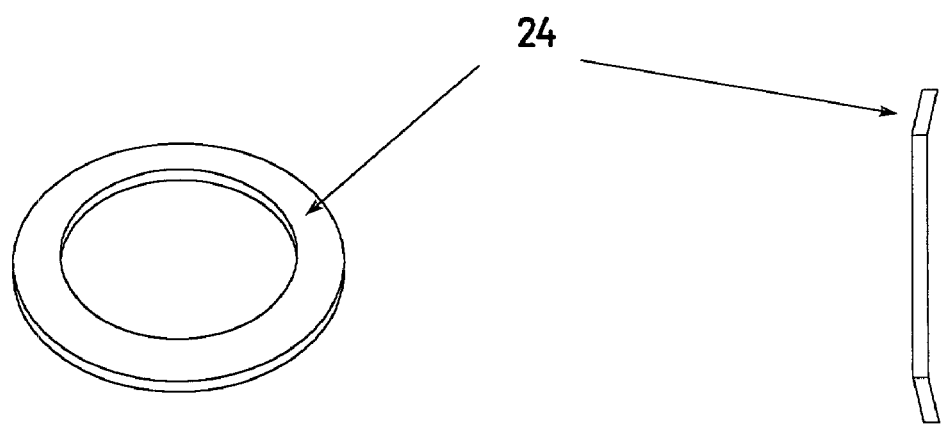
FIG. 12 is an isolation of formed rings used to hold the sprocket assembly in place.
Figure 14:
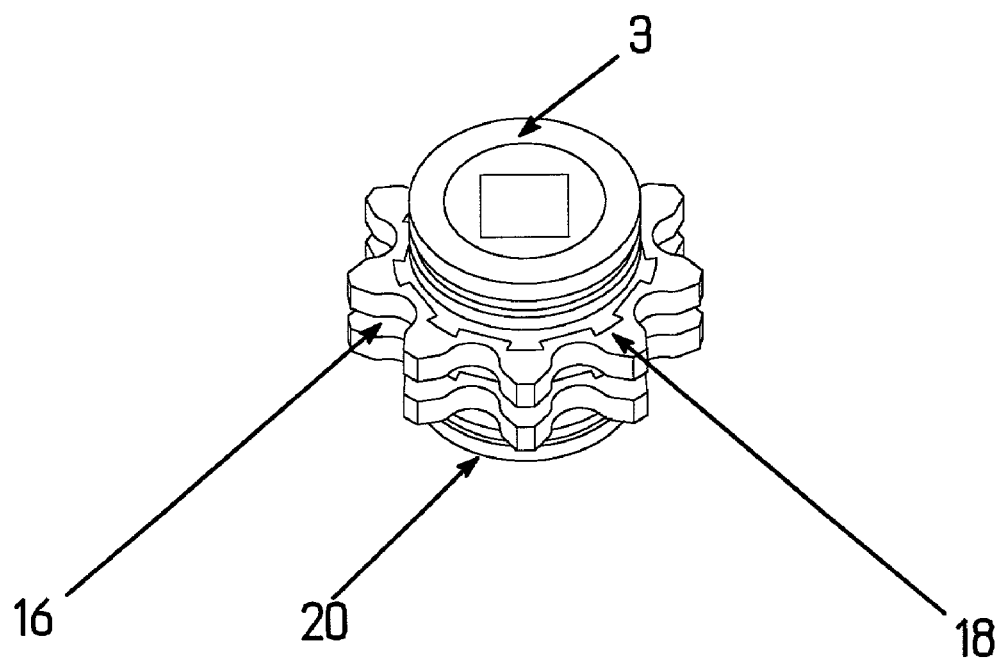
FIG. 14 is an isolation of the sprocket assembly.

The body of each sprocket is preferred to have splines 14 that accept and hold teeth. This construction reduces production time and facilitates assembly. Two sets of teeth 16, 18 and one body 20 make up the sprocket as shown in FIG. 14. Grooves 22 are formed in the body of the sprockets to receive locking rings 24. FIG. 12. Groove depth and location must ensure freedom of movement, while also holding the sprockets together.

The sprocket teeth are designed to contact the pins above their center, and are preferred to be rounded between the points of the teeth to smoothly pick the pins from the shedder 5, and to transfer the pins around the sprocket. The gullets of the sprockets cannot be too high or the pins will bind, and they cannot be too low, which will result in slack in the direct drive. Once assembled, the two sets of teeth create a center groove 26 in the sprocket that guides the links around the sprocket.

Figure 7A:
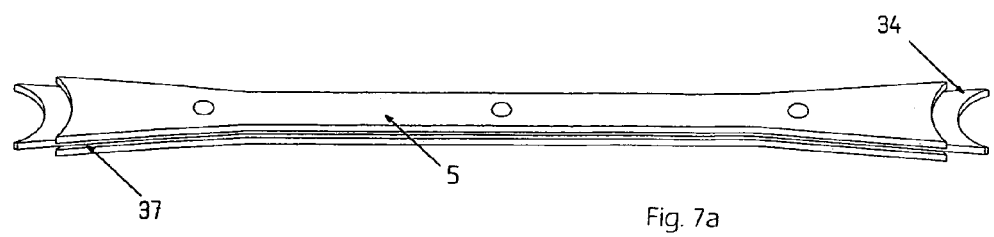
FIG. 7a is an isolation of the shedder.
Figure 7B:
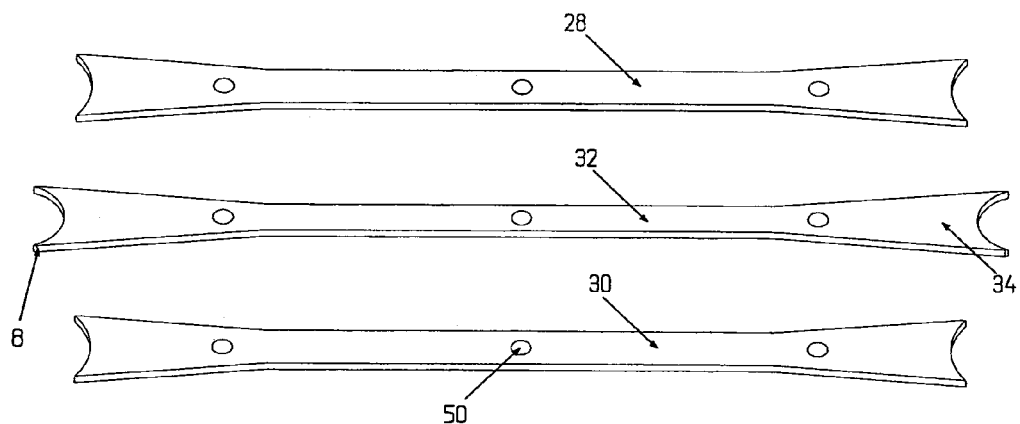
FIG. 7b is an exploded view of the shedder.

The shedder as shown comprises an upper level 28, a lower level 30 and a center level 32. The levels may be connected, and spot welded, to form a unit. FIG. 7. The shedder could be formed as a single unit with the same resulting structure. The shedder provides a track for the links and guides the links. The ends 34 of the shedder engage the grooves 26 in the sprockets (but do not contact the sprockets) and provide a continuous track for the links through the shedder and both of the sprockets. The shedder guides the links onto the sprocket, and prevents the pins from dropping, and prevents the pins from riding over each other so as to bind. The shedder 5 guides the pins off the sprocket and does not allow override of the pins. Hole location in all three members that form the shedder must be closely centered, and it is preferred that a tolerance of 0.002 is maintained. This keeps the shedder from being forced sideways by torque, and acting as a brake.

As shown in FIG. 7, the upper level of the shedder and the lower level of the shedder extend beyond the center level of the shedder so that groove 37 is formed between them. This groove is present on opposite sides of the shedder and on the sides of the shedder that are adjacent to the sides of the housing. A space between the sides of the housing and the shedder form a track through which the pins are guided as the continuous direct drive means rotates. The rib in the housing also forms part of this track in a preferred embodiment.

As shown in FIG. 7, the center level of the shedder extends beyond the upper level of the shedder and the lower level on opposite ends of the shedder. These ends of the center level engage the groove in the sprockets. The ends of the upper level and the lower level of the shedder are arcuate and concave, and engage (but do not contact) the upper and lower teeth of the sprockets. This engagement of the upper level and lower level with the teeth of the sprockets guides the pins onto, and out of, the sprockets, while the engagement of the center member guides the links into, and out of, the grooves of the sprockets.

Figure 8:
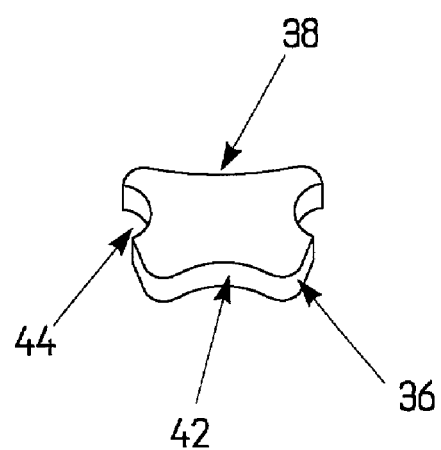
FIG. 8 is an isolation of the link.
Figure 9:
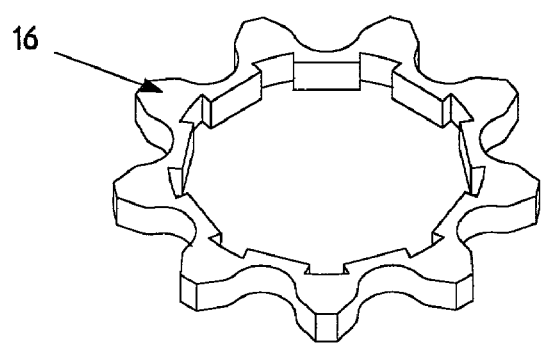
FIG. 9 is an isolation of a set of teeth.
Figure 13:
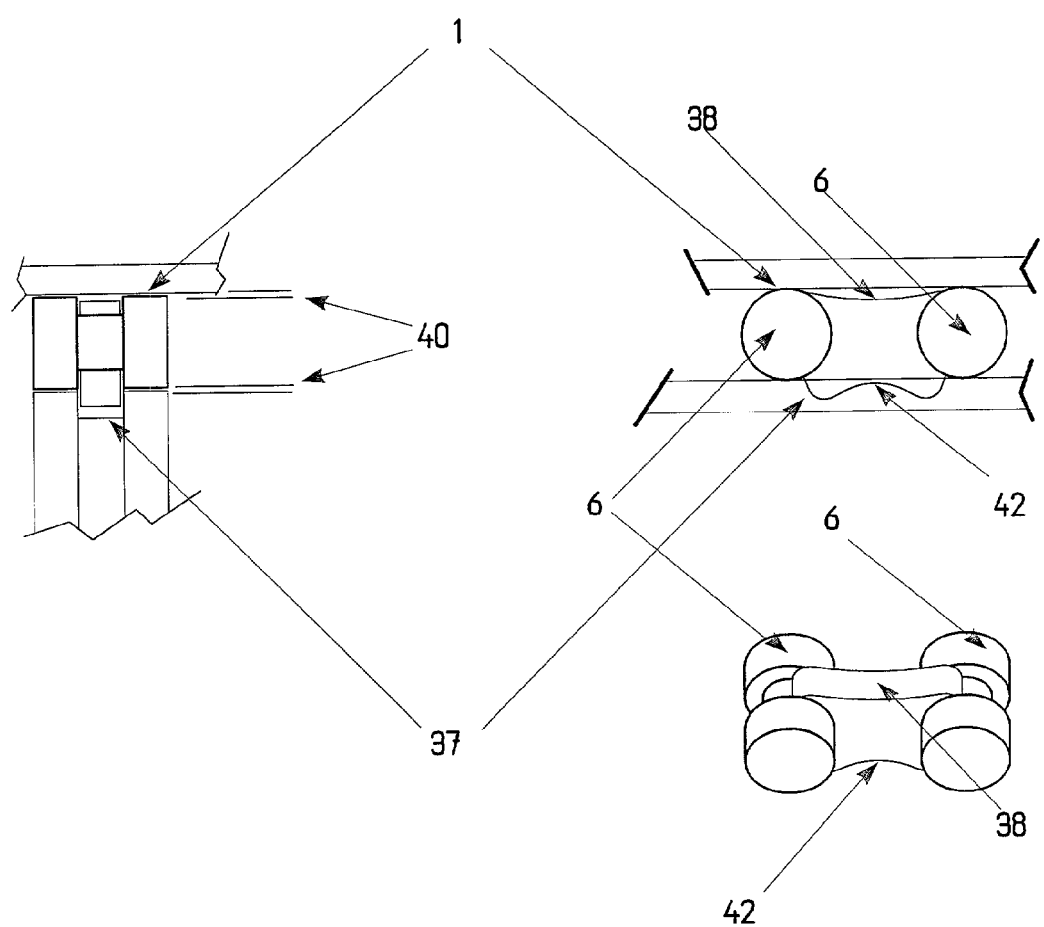
FIG. 13 demonstrates the engagement of the links and pins with the shedder and the housing.

An additional embodiment of the links is shown in FIG. 8. Tabs 36 on the bottom of the links engage the groove 37 in the shedder to keep the links and pins from misaligning due to torque. The tabs also guide the links onto the sprockets and are present in the center groove 26 that is between the teeth. Clearance is provided between the bottom of the track and the tabs to keep the links from dragging. The tops 38 of the links are shaped to retard the links from dragging on the housing when torque pushes the pins and links, which may cause them to jackknife. The top of the link is below the top of the adjacent pins as shown in FIG. 13 so that pin rolls on the housing and the link does not contact the housing, even if pushed upwardly by forces on the link. If torque forces the pin down, it rolls on the shedder rails and the link will not contact the shedder. This design is necessary to negate friction and the resulting braking effect. Clearance is present (FIG. 13, 40) between the pins and the housing, and also between the pins and the shedder. The inside edges 42 of the links are arched to fit around the sprocket, and also help minimize friction, and achieve proper travel of the links along the shedder groove. The ends 44 of the links have an arcuate shape and engage the center section of the pins. As shown in FIG. 8, the link of this embodiment has an arcuate and concave surface on each of four sides.

Hardened rivets 46 have spiral grooves 48 to grip and align components when pressed into the holes through both housing halves and the shedder. The location of holes 50 side to side and end to end are preferred to be held within 0.002 inches to facilitate a smooth running assembly and accurate transfer of torque Formed rings 24 fit over the sprocket to complete assembly, and are sized to snap into place, and then be able to rotate. The formed rings keep the ends of the casing from separating, while providing a spring bias that keeps the sprocket centralized.

The present invention may be used with hand tools or power tools. Hand tools and power tools commonly use six point, or hexagonal, engagement means, or twelve point engagement means. Torque is applied from another rotating device, or drive. The rotating device could be any known tool, including a wrench, ratchet, screwdriver, or a power tool, a motor, or a transmission, or other device that will apply a rotational force to the sprocket. The rotation of the direct drive by the first sprocket causes rotation of the second sprocket. In this manner, torque is transferred to the second sprocket. Power take off means may be supplied, and application means, such as a tool, a generator, a pump, or other device that is actuated by the application of torque could be used. For the purpose of increasing or decreasing torque, or increasing or decreasing rotational speed, sprockets of different effective diameters could be employed, with the housing modified accordingly.

The best mode for using the device is as extension for tools. A drive, such as the drive of a ratchet or air wrench is inserted into the first drive sprocket. The direct drive transfers torque to the second drive sprocket, and a socket or other tool can be used to tighten or loosen a threaded fastener at a location which is remote from the wrench. The device is particularly suited to such an application since tools for torquing threaded fasteners must be able to handle high torque, while the space in which such tools are used is frequently limited, meaning that the tool must be as small as possible. Other uses for the device are apparent from the disclosure of the device herein.

What is claimed is:

1. A torque transfer device, comprising:
   a. a first drive sprocket and a second drive sprocket, wherein each of said first drive sprocket and said second drive sprocket have a groove formed therein;
   b. a shedder that is disposed between said first drive sprocket and said second drive sprocket, wherein said shedder has a an upper level, a center level and a lower level, and wherein said upper level and said lower level extend beyond a middle level on opposing sides of said shedder to form a center groove in said shedder;
   c. a continuous loop direct drive comprising a plurality of alternating pins and links, wherein an inside edge of each of said links engages said groove of said first drive sprocket, said groove of said second sprocket and said center groove in said shedder as said continuous loop direct drive means rotates; and
   d. a housing that contains said first drive sprocket, said second drive sprocket said direct drive and said shedder, wherein said housing has an upper portion and a lower portion, and said lower portion has a rib that is longitudinally disposed in said lower portion of said housing, and wherein said rib contacts said lower level of said shedder.

2. A torque transfer device as described in claim 1, wherein each of said pins has a upper section, a lower section and a center section, wherein said center section is of reduced diameter from said upper section and said lower section, and each end of each of said links has an concave surface, wherein said each end of each link adjoins one of said pins and engages one of said pins at said center section thereof.

3. A torque transfer device as described in claim 2, wherein said first drive sprocket has an upper set of teeth and a lower set of teeth, and wherein said groove of said first drive sprocket is positioned between said upper set of teeth and said lower set of teeth, and wherein said upper section of each of said pins engages said upper set of teeth and said lower section of each of said pins engages said lower set of teeth as said continuous loop direct drive means rotates.

4. A torque transfer device as described in claim 2, wherein said upper section of each of said pins contacts said upper level of said shedder and contacts an interior of said housing and said lower section of each of said pins contacts said lower level of said shedder and contacts an interior of said housing as said continuous loop direct drive means rotates.

5. A torque transfer device as described in claim 1, wherein said middle level of said shedder extends beyond said upper level of said shedder and said lower level of said shedder at a first end of said shedder and at a second end of said shedder that is opposite said first end, and wherein said middle level of said shedder engages said groove of first drive sprocket at said first end of said shedder and engages said groove of said second drive sprocket at said second end of said shedder.

6. A torque transfer device as described in claim 5, wherein said first end of said center level of said shedder that engages said groove in said first drive sprocket has a concave and arcuate shape.

7. A torque transfer device as described in claim 5, wherein said first drive sprocket has an upper set of teeth and a lower set of teeth, and wherein said groove of said first drive sprocket is positioned between said upper set of teeth and said lower set of teeth, and wherein a first end of said upper level of said shedder is near said upper set of teeth and a first end of said lower level of said shedder is near said lower set of teeth of said first drive sprocket.

8. A torque transfer device as described in claim 7, wherein said first end of said center level of said shedder that engages said groove in said first drive sprocket has a concave and arcuate shape, and wherein said first end of said upper level of said shedder has a concave and arcuate shape.

9. A torque transfer device as described in claim 8, wherein said first end of said lower level of said shedder has a concave and arcuate shape.

10. A torque transfer device as described in claim 1, wherein said inside edge of each of said links has a concave shape.

11. A torque transfer device, comprising:
  a. a first drive sprocket and a second drive sprocket;
  b. a continuous loop direct drive which engages each of said first drive sprocket and said second drive sprocket, said continuous loop direct drive comprising a plurality of alternating pins and links, and wherein each of said links engages one of said pins at each end of said each of said links, and wherein said pins are not attached to said links;
  c. a housing that contains said first drive sprocket, said second drive sprocket and said direct drive;
     wherein said first drive sprocket has an upper set of teeth and a lower set of teeth, and wherein said first drive sprocket engages said plurality of links between said upper set of teeth and said lower set of teeth, and wherein said upper set of teeth engage an upper portion of each of said plurality of pins and said lower set of teeth engage a lower portion of each of said plurality of pins.

12. A torque transfer device as described in claim 11, wherein each of said plurality of pins has a first end and a second end, wherein said first end and said second end are connected by a center member which is of reduced size, and wherein each end of said plurality of links engages one of said plurality of pins at said center member.

13. A torque transfer device as described in claim 12, wherein each end of each of said plurality of links is arcuate and concave.

* * * * *